INVENTORS:
TIBOR E. TALLIAN
LEWIS B. SIBLEY
BY Howson & Howson
ATTYS.

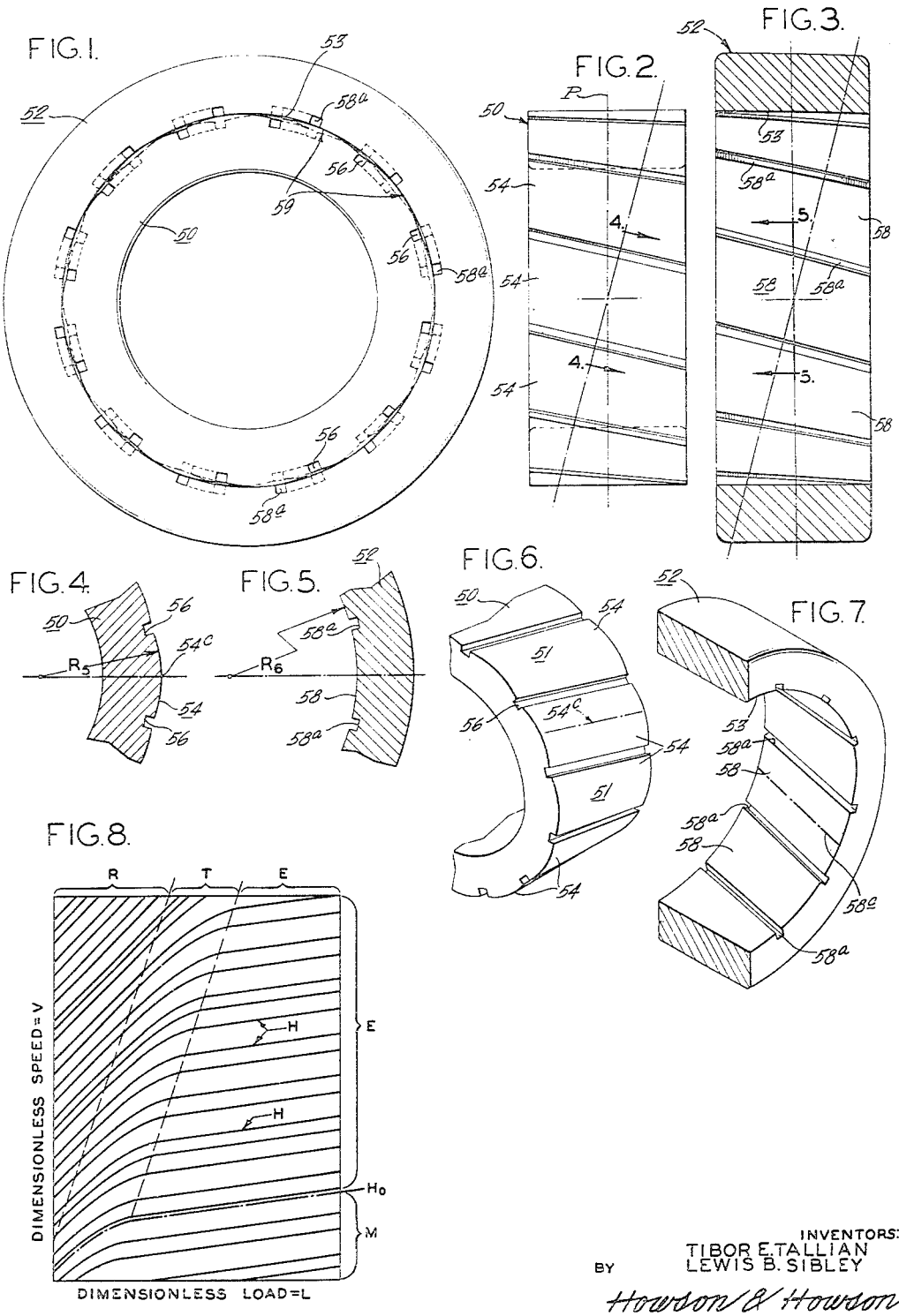

Dec. 16, 1969   T. E. TALLIAN ET AL   3,484,143

ELASTOHYDRODYNAMIC SLIDING BEARINGS

Filed Aug. 16, 1968   3 Sheets-Sheet 3

INVENTORS:
TIBOR E. TALLIAN
LEWIS B. SIBLEY

BY Howson & Howson
ATTYS.

United States Patent Office 3,484,143
Patented Dec. 16, 1969

3,484,143
ELASTOHYDRODYNAMIC SLIDING BEARINGS
Tibor E. Tallian, Newtown Square, and Lewis B. Sibley, Wayne, Pa., assignors to SKF Industries, Inc., King of Prussia, Pa., a corporation of Delaware
Continuation-in-part of application Ser. No. 649,762, Mar. 10, 1967. This application Aug. 16, 1968, Ser. No. 753,275
Int. Cl. F16c 27/02, 27/06, 33/00
U.S. Cl. 308—121
11 Claims

ABSTRACT OF THE DISCLOSURE

An elastohydrodynamic sliding bearing comprising first and second relatively movable members having intercontacting bearing surfaces. The movable members may comprise inner and outer rings in such a manner to provide a plurality of contact zones. A lubricant is provided between the bearing surfaces so that when the rings are rotated relative to one another while being in pressure-applying relation, a load-carrying uninterrupted elastohydrodynamic film is formed for a predetermined range of entrainment velocities of the members moving through the contact zones and for a predetermined range of loads and contact curvatures. It has been found that ranges of variables to produce an elastohydrodynamic film are given approximately by the following inequalities:

$$\frac{G^{1.6}V^{0.7}}{L^{0.13}} = 1.5 \frac{\sigma}{R_c} \frac{V}{L^2G^{1.7}} \leq 10^7$$

where G is the material parameter, V is the entrainment velocity, L is load, $R_c$ is the equivalent radius of the contacting surfaces and $\sigma$ is the surface roughness of the surfaces in contact.

---

This is a continuation-in-part application of my prior co-pending application Ser. No. 649,762, filed Mar. 10, 1967, for Elastohydrodynamic Sliding Bearings, which in turn is a continuation-in-part of my prior application Ser. No. 457,913, filed May 24, 1965, now abandoned, for Elastohydrodynamic Sliding Bearings.

In the present instance, the ring members are formed with helical surfaces which are angularly disposed relative to one another so that the contact zones along the crown lines move axially relative to the rings. By this arrangement and by reason of the angular relationship of the crown lines as the rings rotate relative to one another there is not only a circumferential sliding velocity component in the contact zones, but also an axial entrainment velocity component. Only the sliding velocity component develops friction, but both develop film thickness so that there is comparatively small development of the friction and high development of film thickness.

Also, the presence of an entrainment velocity component operating at right angles to the sliding velocity component produces an effective contact radius in the entrainment direction which is different (usually greater) than the effective radius in the sliding direction. Since film thickness depends primarily on the radium in the entrainment direction, a larger film thickness will be obtained using a larger effective contact radius in the entrainment direction.

Also, the smaller effective radius which can be used in the sliding direction leads to a shorter contact duration in any cross-section of the bearing, thereby limiting the length of track over which any two lines on the surfaces, in the direction of sliding, remain in contact. It has been found that a limitation of such track length substantially increases the ability of contacts to carry load without galling-type material transfer. For this reason, the bearing described in this invention is expected to carry higher specific loads, particularly at starting and at very low speeds of rotation than is otherwise possible.

The present invention relates to bearings and more particularly to a new and improved type of bearing designated as a helix-type "elastohydrodynamic, variable viscosity sliding bearing."

In order to highlight the principle of operation of the elastohydrodynamic sliding bearing of the present invention and its advantages over conventional bearing, it is considered desirable to discuss briefly the principle of operation and other factors such as load-carrying capacity, accuracy, lubricant requirements and friction, wear and fatigue characteristics of conventional bearings. For purposes of this discussion, bearings may be classified broadly in three main divisions; that is, hydrodynamic sliding bearings, rolling bearings, and hydrostatic sliding bearings.

In the operation of conventional hydrodynamic sliding bearings, the confronting surfaces of the bearing members sliding on each other are rigid and the lubricant in the form of a film between the bearing surfaces, which is under hydrodynamic pressure generated by the motion of the bearing itself, serves to support the bearing surfaces in spaced relation to permit relative movement of the bearing members without wear. In hydrostatic fluid film bearings, the confronting surfaces of the bearing members are maintained in spaced relation by a fluid lubricant pressurized hydrostatically, from an outside source.

In rolling bearings, the bearing surfaces rolling on each other are elastic, and the lubricant is often present in the form of a film between the bearing surfaces. This film is under hydrodynamic pressure generated by the motion of the bearing itself. The hydrodynamic pressure is balanced by the elastic pressures arising from elastic deflection of the bearing surfaces. This interaction of hydrodynamic and elastic pressures is called an elastohydrodynamic condition.

The conventional hydrodynamic sliding bearing which may be characterized as a rigid isoviscous sliding device is in one simple form, a stationary sleeve which is used to support a rotatable member such as a shaft in a stationary housing. These sleeve bearings are generally employed in applications where radial space is an important factor since this type of bearing usually requires less radial space than many types of rolling bearings. Conventionally, a lubricant is provided between the interengaging cylindrical surfaces of the sleeve and shaft whereby upon relative rotation of the bearing surfaces, the hydrodynamic lubricant pressure builds up to support the shaft. In this type of bearing, there is a comparatively large contact area between the interengaging cylindrical bearing surfaces whereby the unit pressure is low and therefore, there is a comparatively small lubricant film pressure. Hence, a relatively small supporting force or lifting force is provided by a given area of the lubricant film. This type of bearing provides an accurate support at low loads and high speeds. However, as the load is increased, the film thickness drops and inaccurate shaft support results. Also, due to imperfections in the contacting bearing surfaces such as waviness, eccentricity and surface roughness, at high loads or under shock loading conditions, the lubricant film breaks down and the imperfections rub or engage, thereby resulting in wear and possible breakdown of the bearing. In this type of bearing the limited accuracies available in the large rigid bearing surfaces require relatively high values of film thickness to prevent rubbing of imperfections. However, the disadvantage of a thick film is that it requires great quantities of lubricant and as the film thickness varies in a variable speed and variable load application, the alignment accuracy of the supported members such as the shaft is affected. In terms of friction, hydrodynamic sliding bearing friction is low at medium speeds and high at high speeds and at zero speed. There is high wear at low speeds and substantially no wear at high speeds. The hydrodynamic sliding bearing does not show appreciable fatigue.

Rolling bearings, which may be characterized as elastic variable-viscosity rolling devices, typically comprise inner and outer rings which are spaced apart to define an annular space for a plurality of rolling elements, either balls or rollers. These bearings require somewhat more radial space than hydrodynamic sliding types but much less axial space. They require small quantities of lubricant and the friction and wear factors are low over a wide speed range. However, the bearings eventually fail in fatigue. Rolling bearings provide extremely accurate support at low to medium loads and any speed. In these bearings, the total contact area between the balls or rollers and the rings is comparatively small and the unit pressures are extremely high and, therefore, load-carrying capacity is limited by the ability of the bearing material to withstand high stress without premature fatigue.

The elastohydrodynamic films in rolling bearings are extremely thin, and their thickness varies very little with load due to the property of the lubricants used that their viscosity increases greatly under the high pressures in the contact areas of rolling bearing enabling the lubricant to carry high loads per unit area. The accuracy of a rolling bearing is limited under very high loads by the elastic deflections of the bearing surfaces at the small contact areas. In rolling bearings, the load-carrying capacity of a given bearing could be increased by enlarging the contact area between the rolling elements and the rings. However, the obvious limitation here is that as the size of the rolling elements is increased to increase the contact area, the size of the bearing increases and the wasted space between the rollers also increases.

In the third category, that is, the hydrostatic sliding bearings, the rotating shaft is supported or floated on a body of pressurized fluid lubricant, either gaseous or liquid. This arrangement requires a comparatively complicated and expensive lubricant feed system for the assembly. Furthermore, it is clear that difficulties in the lubricant feed system can prevent suitable operation of the bearing. The hydrostatic bearings are also rigid isoviscous sliding devices, and the limitations of accuracy in case of high or shock loads as well as high friction at high speed noted for hydrodynamic bearings apply to them also.

It has been found that if the confronting surfaces of a pair of bearing elements are of a given configuration to define a concentrated contact zone of a given geometry at a predetermined load and at a predetermined relative sliding movement of the bearing surfaces, that an uninterrupted load-carrying elasto-hydrodynamic film forms in the area of the contact zones to support the surfaces for optimum relative movement and the material of the bearing surfaces elastically deforms in the contact zones so that only a film thickness greater than the combined imperfection of the bearing surfaces need be provided to support the members for relative movement.

Further, it has been found that in a bearing in accordance with the present invention, the accuracy of shaft positioning varies little over a wide load range; that is, the thickness of the elastohydrodynamic film remains substantially uniform regardless of load and thus, is insensitive to impact loading and provides extremely accurate support. For example, in accordance with one of the forms of elastohydrodynamic sliding bearing of the present invention, the bearing comprises an outer ring having a generally cylindrical inner surface and an inner ring or shaft having a plurality of circumferentially spaced, outwardly directed arcuate projections in the form of spherical or convex protrusions which contact the bearing surface of the outer ring at a plurality of contact zones. In this bearing assembly, when load is applied, the contact points (zones) elastically deform into relatively small, but distinct, contact areas so that when a lubricant is interposed between the contact areas and the rings are rotated relative to one another within a predetermined range of velocities, an uninterrupted load-carrying elastohydrodynamic film is formed at all of the contact areas providing a fluid film-supported bearing.

The elastohydrodynamic sliding bearing of the present invention has advantages over conventional rolling bearing assemblies. The sliding bearing of the present invention has a greater load-carrying capacity for a given overall size because the contact conformity or osculation is outstanding or high in all planes.

The sliding bearing of the present invention is more compact radially than rolling bearing assemblies by reason of the fact that the rolling elements are eliminated, can be more simplified since no rolling elements and no cage is necessary and is also more economical to manufacture by reason of the fact that it has fewer parts, that is, no rolling elements.

In comparison with hydrodynamic bearings, the helix-type elastohydrodynamic bearing of the present invention requires much less lubricant, wears less at low speeds, has greater load-carrying capacity, is more accurate at all speeds and loads, and is more compact axially.

The elastohydrodynamic sliding bearing of the present invention has several advantages over hydrostatic bearings. For example, in hydrostatic bearings, the rotating elements of the bearing assembly are supported or floated on a body of pressurized fluid lubricant, either gaseous or liquid, and this requires a comparatively complicated and expensive lubricant feed system. No such pressurized lubricant supply is needed in the bearing of the present invention. The advantages of axial compactness and load independent accuracy listed in comparison with hydrodynamic sliding bearings also apply here.

The elastohydrodynamic sliding bearing of the present invention provides for load independent rigid shaft positioning due to thin films and high conformities at the contact areas and has a greater load-carrying capacity for a given size as compared to fluid film bearings because of the virtual independence of film thickness from load and for the same reason is insensitive to impact loading.

The elastohydrodynamic sliding bearing has longer fatigue life under a given load than a rolling bearing of the same size because the pressures on the bearing material in the contacts will be lower due to the better conformity. The sliding bearing of the present invention has high accuracy of shaft positioning at all loads because contact deformations are small and the elastohydrodynamic supporting film is very thin. Moreover, in the elastohydrodynamic sliding bearing of the present invention, the lubricant requirement is small and thus the entire bearing assembly may often be lubricated for life at assembly, it being noted that in these cases there is no external lubricant supply problem in bearing assemblies made in accordance with the present invention. Furthermore, the elastohydrodynamic sliding bearing of the present invention can be made in embodiments suitable for carrying radial and thrust loads.

With the foregoing in mind, an object of the present invention is to provide a new type of elastohydrodynamic sliding bearing which is characterized by novel features of construction and arrangement, providing high load-carrying capacity and good resistance to fatigue and galling.

Another object of the present invention is to provide an elastohydrodynamic sliding bearing assembly which is of comparatively simple construction and which is easy and economical to manufacture.

Still another object of the present invention is to provide an elastohydrodynamic sliding bearing which is adapted for accurate support of parts in high precision applications.

These and other objects of the present invention and the various features and details of a bearing assembly constructed in accordance with the present invention are hereinafter more fully set forth with reference to the accompanying drawings, wherein:

FIG. 1 is a side elevational view of an elastohydrodynamic sliding bearing in accordance with the present invention;

FIG. 2 is an end view of the inner ring of the sliding bearing shown in FIG. 1;

FIG. 3 is a transverse sectional view of the outer ring of the sliding bearing of FIG. 1;

Figure 9:
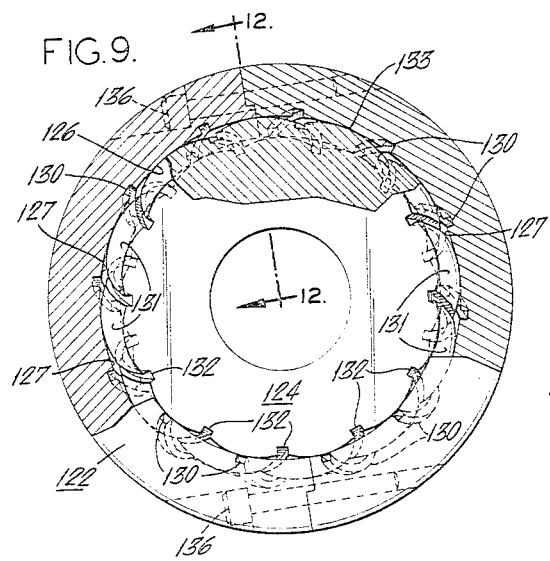
Figure 10:
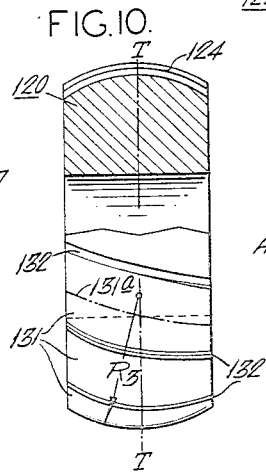
Figure 11:
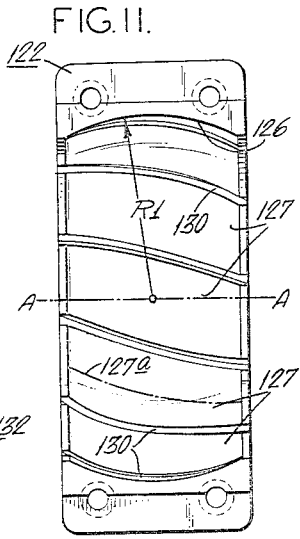
Figure 12:
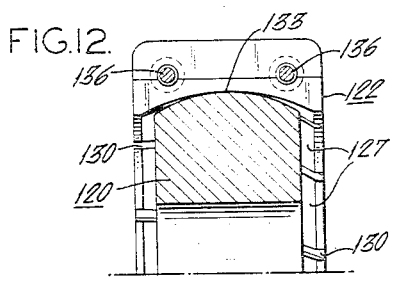
Figure 16:
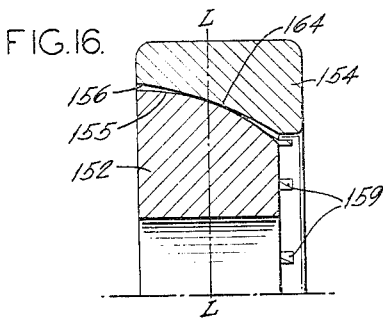
Figure 13:
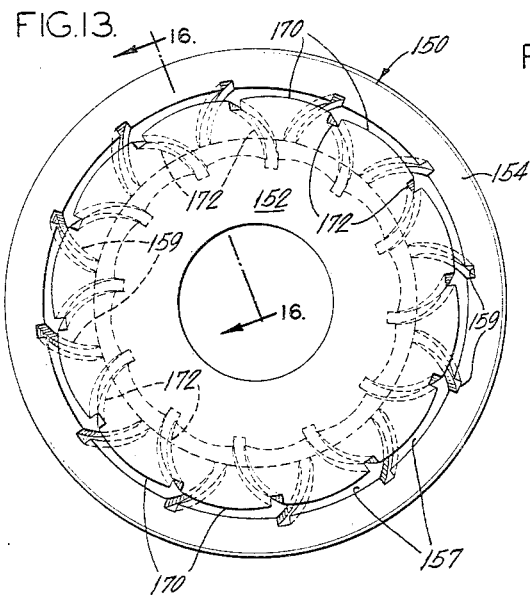
Figure 14:
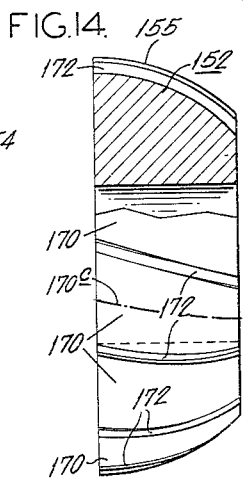
Figure 15:
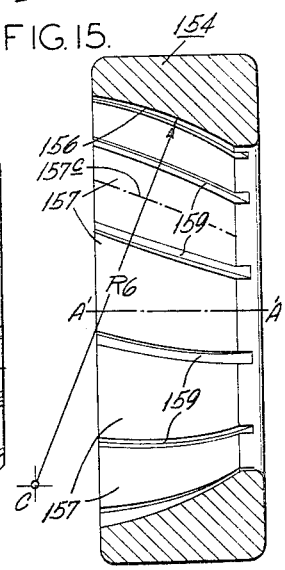

FIGS. 4 and 5 are fragmentary sectional views taken on lines 4—4 and 5—5 of FIGS. 2 and 3 respectively;

FIGS. 6 and 7 are fragmentary perspective views of the inner and outer rings of the bearing of FIG. 1;

FIG. 8 is a chart of dimensionless load v. dimensionless speed with a series of lines representing film thickness for given lubricants;

FIG. 9 is a side elevational view partly in section of a second embodiment of elastohydrodynamic sliding bearing in accordance with the present invention;

FIG. 10 is a side elevational view partly in section of the inner ring of the bearing shown in FIG. 9;

FIG. 11 is a transverse section through the outer ring of the bearing shown in FIG. 9;

FIG. 12 is a sectional view taken on lines 12—12 of FIG. 9;

FIG. 13 is a side view of a third embodiment of elastohydrodynamic sliding bearing in accordance with the present invention;

FIG. 14 is a side view partly in section of the inner ring of the bearing shown in FIG. 13;

FIG. 15 is a transverse sectional view through the outer ring of the bearing shown in FIG. 13;

FIG. 16 is a sectional view taken on lines 16—16 of FIG. 13.

Figure 17:
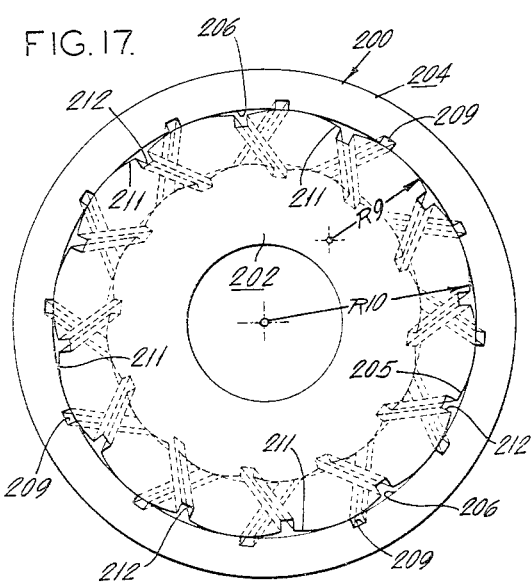
Figure 18:
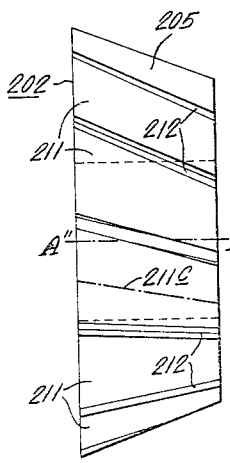
Figure 19:
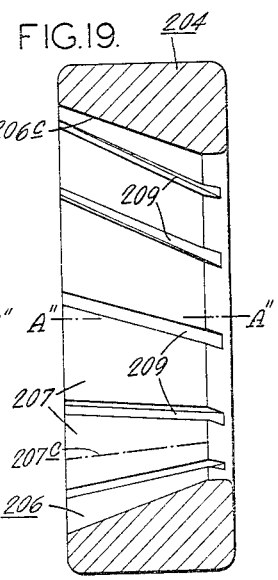
Figure 20:
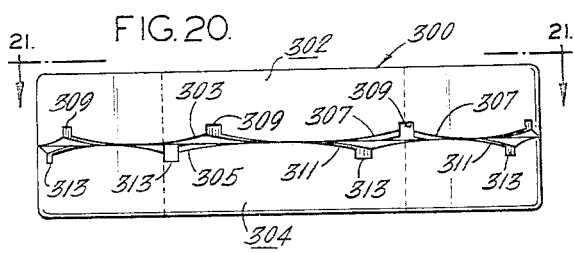
Figure 21:
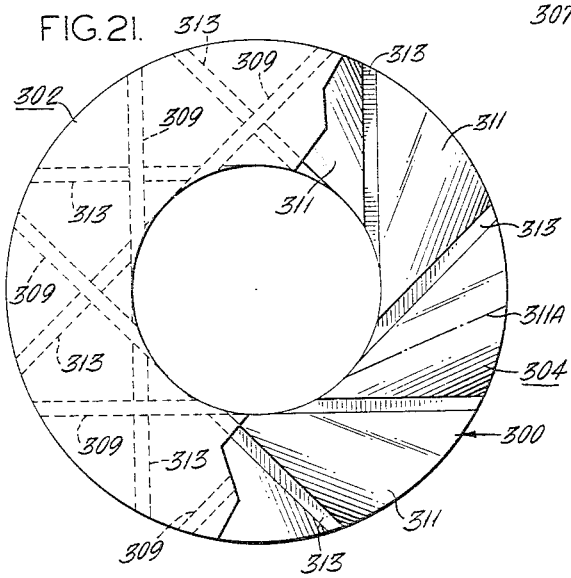

FIG. 17 is a side elevational view of a fourth embodiment of elastohydrodynamic sliding bearing in accordance with the present invention;

FIG. 18 is an end view of the inner ring of the sliding bearing shown in FIG. 17;

FIG. 19 is a transverse sectional view of the outer ring of the sliding bearing of FIG. 17;

FIG. 20 is a view of a fifth embodiment of elastohydrodynamic sliding bearing in accordance with the present invention;

FIG. 21 is a view taken on lines 21—21 of FIG. 20; and

Figure 22:
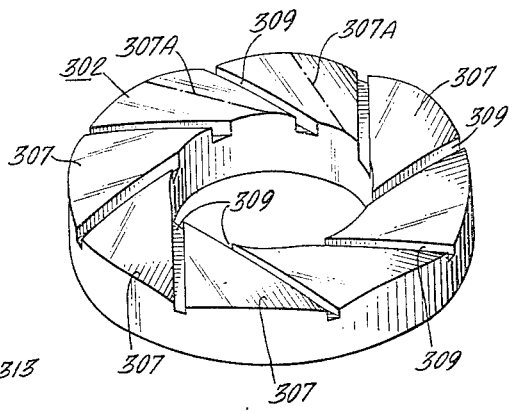

FIG. 22 is a perspective view of one of the rings of the bearing assembly of FIG. 20.

Referring now to the drawings and particularly to FIGS. 1–7, there is illustrated an helix-type elastohydrodynamic sliding bearing assembly in accordance with the present invention. The elastohydrodynamic sliding bearing of the present invention comprises in broad terms first and second relatively movable members having confronting bearing surfaces with both of the bearing surfaces having a plurality of arcuate sections defining contact zones with the bearing surface of the other member whereby when the members are moved relative to one another at a predetermined rate while they are in a predetermined pressure-applying elation, an uninterrupted elastohydrodynamic film is formed between the bearing members at the contact zones providing a fluid film-supported sliding bearing. More specifically and with reference to the enclosed chart wherein load is plotted against rate of relative movement of the sliding bearing surfaces, the elastohydrodynamic film forms in the elastic region marked "E" at a given load range and range of movement relationship within that region whereby the minimum film thickness required to support the members may be very small as long as it is greater than the combined imperfections of the members at the contact zones and remains substantially constant even as load is increased considerably, so that for all practical purposes, the film thickness is insensitive to load.

The bearing assembly comprises inner and outer rings 50 and 52 respectively which have confronting bearing surfaces 51 and 53 respectively. The bearing surface 51 of the inner ring has a plurality of convex helical surfaces 54 which extend angularly relative to the plane P transverse to the central axis of the ring and which, as illustrated, are separated by a plurality of circumferentially spaced, angularly directed grooves 56. As best illustrated in the fragmentary views, FIGS. 4 and 5, each of the projections is of circular or other convex cross section. The bearing surface 53 of the outer ring is defined by a plurality of helical surfaces 58 separated by grooves 58a. The surface 58 and grooves 58a are disposed at an angle to the plane T transverse to the central axis of the ring. The radius of curvature $R_5$ of the helical surface 54 is smaller than the radius of curvature $R_6$ of the helical surfaces 58. The direction of the helical surfaces 54 and the helical surfaces 58 are opposed, as illustrated, so that in the assembled relation, the crown line 54c of the helical surfaces 54 is angularly disposed to the crown line 58c of the helical surfaces 58 whereby upon relative rotation of the rings, the contact zone 59 moves along the crown line axially relative to the rings. The spacing between adjacent helical surfaces on both rings and their helix angles are so selected that a contact zone is established at one end of the bearing at the time or before the corresponding contact zone reaches the opposite end of the bearing in the course of its axial motion. By this arrangement, and by reason of the angular relationship of the crown lines of the helical bearing surfaces as the rings rotate relative to one another, there is not only a circumferential sliding velocity component in the contact zones, but also an axial entrainment velocity component in the contact zone. Only the sliding velocity component develops friction, but both it and the entrainment velocity component develop film thickness. The angular relationship of the helical surfaces to the bearing axis is preferably small, that is, less than 45° whereby the entrainment velocity component is greater than the sliding velocity component so that there is comparatively small development of friction and high development of film thickness. This type of bearing will function as an elastohydrodynamic bearing at particularly low speeds.

It is found from the geometry of the configuration described, when the helix angle of the bearing surfaces in both rings is less than 45°, that the area of contact between any two surfaces will be elliptical and elongated in the axial direction. The radii of curvature of the bearing surfaces in the axial or entrainment direction will be larger than the radii in the circumferential or sliding direction. This increases the lubricant film thickness obtained in the bearing as will be shown later.

It is also generally known in the art that two metal surfaces sliding on each other under load may, for heavy loads and inadequate lubrication, suffer "galling" failure consisting of the transfer of surface material from its original position to other positions, thereby destroying the accuracy of the surfaces as made. It has been found that a given contact of metal surfaces sustains, in the presence of a given lubricant, temperature and sliding speed, a higher load without galling if there exists, in addition to the sliding velocity component, a rolling or entrainment velocity component in the contact, and that this load increases with the ratio of entrainment/sliding velocities. The present invention provides for a particularly high ratio of these velocities and bearings constructed according to this invention will therefore show high load carrying ability and freedom from galling even at comparatively low rotational speeds.

A similar configuration can be constructed using basically conical, spherical or plane surfaces or combinations of these instead of cylindrical surfaces on which the helices are superimposed, thereby producing a bearing which carries radial combined or thrust loads and is either angularly rigid or self aligning. It is noted that any other surface of rotation can also serve as a base surface provided that suitable provisions are made to permit assembly of the bearing.

By way of illustration, the chart shown in FIG. 8 is a plot applicable for a given contact material and lubricant, as defined by a given value of the material parameter $G=\gamma E^1$, where $\gamma$ is the viscosity pressure exponent of the lubricant in the equation $\mu=\mu_1 e\gamma p$ with $e$ the basis of natural logarithms, $p$ pressure and $\mu$ and $\mu_1$ absolute viscosities at pressure $p$ and atmosphere, respectively. $E^1$ is the reduced modulus of elasticity defined below. The chart gives dimensionless load versus dimensionless speed for elastohydrodynamic bearings and is divided into four zones, rigid R, transitional T, elastic E and mixed-lubricated M and shows a series of lines H designating dimensionless film thickness. In the rigid zone, the bearing surfaces are relatively rigid, since the hydrodynamic fluid film pressures are relatively small, and in the elastic zone the bearing surfaces are elastically deformed and lubricant viscosity is increased in the contact zone since the elastohydrodynamic fluid film pressures are relatively high. In the transitional zone T lubricant viscosity is increased, but elastic deformation is negligible. In the mixed-lubricant zone M film thickness does not suffice to separate all surface asperities and therefore only an incomplete film exists at the contact zone. The bearing according to this invention is intended to operate in the elastic zone but may, in many cases, be safely operated in any of the other zones shown on the chart.

In the chart, dimensionless entrainment velocity is defined as:

$$V=\mu_U/E^1 R_c$$

where $\mu$ equals viscosity of the lubricant at the contact inlet, U equals relative entrainment velocity of contact surfaces and is further defined as $$U=\frac{v_1+v_2}{2}$$

where $v_1$ and $v_2$ are the linear velocities in the direction of the entrainment velocity of the surfaces in contact with reference to such contact, $E^1$ equals reduced modulus of elasticity defined as $$1/E^1=\frac{1}{2}\left(\frac{1-\nu_1^2}{E_1}+\frac{1-\nu_2^2}{E_2}\right)$$

with $v_1$, $v_2$ and $E_1$, $E_2$ the Poisson's ratio and Young's modulus of the two contacting bodies, and $R_c$ is the equivalent radius of the contacting surface defined as $$\frac{1}{R_c}=\frac{1}{R_1}+\frac{1}{R_2}$$

with $R_1$, $R_2$ the radii of (equivalent) helical surfaces in contact. These radii must be measured in the direction of the entrainment velocity, i.e. in the case of a cylindrically shaped helix-type bearing, in the axial direction. Dimensionless load is expressed by the equation, $L=w/E^1 R_c$ where $w$ is load. Film thickness is expressed by $H=h_0/R_c$ where $h_0$ is minimum film thickness. As shown in the chart, the elastohydrodynamic film forms in the elastic region at a given load range and speed range relationship and the minimum elastohydrodynamic film thickness required to support the members may be very small as long as it is greater than the combined surface imperfections of the members at the contact zones, and remains substantially constant even as load is increased so that for all practical purposes, the film thickness is insensitive to load. The minimum film thickness required to support the members is designated on the chart by the line $H_0$. It it noted that this line will vary on the chart depending on the characteristics of the contact surfaces at the contact zones.

In arranging for a bearing according to this invention to function as an elastohydrodynamic bearing, it is necessary that the lubricant film thickness ($h_0$) be sufficient by comparison to the composite surface roughness defined as $$\sigma=(\sigma_1^2+\sigma_2^2)^{1/2}$$

where $\sigma_1$, $\sigma_2$ are the rms. surface roughnesses of the two surfaces in contact. This is accomplished by satisfying the Formula 1 below; in which all quantities are substituted in compatible units of measurement $$\frac{G^{1.6}V^{0.7}}{L^{0.13}}\geq 1.5\frac{\sigma}{R_c} \quad (1)$$

The benefits claimed for the bearing according to this invention are fully realized when it operates in the elastic region E of chart 22. This is accomplished by satisfying, in addition to Formula 1, also Formula 2 below, in which all quantities are substituted in compatable units of measurement $$\frac{V}{L^2 G^{1.7}}\leq 10^7 \quad (2)$$

However, the bearing in this invention can, in general, satisfactorily be operated in regions other than the elastic region E, and will, as a result of temporary changes in load, speed, viscosity and other operating parameters, at times operate in these other regions.

In order to realize to the full extent possible the advantage of increased resistance to galling, for the (temporary) operating conditions where inequality (1) is not satisfied because of slow rotational speed, it is necessary to satisfy another inequality:

$$\frac{U}{S}>K \quad (3)$$

For conventionally lubricated steel contacts $K=1$ with higher values being progressively more effective to prevent galling. For other material combinations, K may be chosen at a different value. In this formula, U is the entrainment velocity defined above and S is the sliding velocity defined as $S=(U_1-U_2)$.

Another embodiment of elastohydrodynamic sliding bearing in accordance with the present invention is illustrated in FIGS. 9–12 inclusive. The bearing illustrated is a self-aligning bearing and comprises inner and outer members, in the present instance, inner and outer rings 120 and 122 respectively having confronting bearing surfaces 124 and 126. As illustrated, the outer ring 122 has a circumferentially extending spherical bearing surface 126 having a radius of curvature R1, the bearing surface 126 in the present instance being divided into a plurality of helical segments 127 by a plurality of circumferentially spaced angularly directed grooves or channels 130 disposed in a predetermined direction relative to the axis A of the ring. The bearing surface 124 of the inner ring 120 is formed with a plurality of circumferentially spaced segments 131 having arcuate surfaces which are separated by a plurality of circumferentially spaced angularly directed grooves 132 which are oriented angularly relative to the grooves 130 in the outer ring. The radius [or radii] of curvature of the segments 131 is [are] small enough and of a smaller radius than the radius R1 of the outer ring so that the pressure at the contact are or zones 133 is sufficiently large whereby the lubricant film developed between the inner and outer rings at the contact zones is elastohydrodynamic. The radius of curvature R3 at the apex of each of the segments 131 is less than the radius of curvature R1 of the spherical bearing surface of the outer ring. For assembly purposes, the outer ring 122 comprises a pair of semi-annular members connected together by a suitable fastening means 136.

The segments 131 and grooves 132 are disposed at an angle to a plane T transverse to the axis A of the rings and the segments 127 and grooves 130 are also angularly disposed to the plane T in an opposed direction. Thus, in the assembled relation, the crown lines 131a of the segments 131 are angularly disposed to the crown line 127a of the segments 127 whereby upon relative rotation of the rings, the contact zones along the crown line move axially relative to the rings.

The spacing between adjacent helical surfaces on both rings and their helix angles are so selected that a contact zone is established at one end of the bearing at the time or before the corresponding contact zone reaches the opposite end of the bearing in the course of its axial motion. By this arrangement, and by reason of the angular relationship of the crown lines of the helical bearing surfaces as the rings rotate relative to one another, there is not only a circumferential sliding velocity component in the contact zones, but also an axial entrainment velocity component in the contact zone. Only the sliding velocity component develops friction, but both it and the entrainment velocity component develop film thickness. The angular relationship of the helical surfaces to the bearing axis is preferably small, that is, less than 45° whereby the entrainment velocity component is greater than the sliding velocity component so that there is comparatively small development of friction and high development of film thickness. This type of bearing will function as an elastohydrodynamic bearing at particularly low speeds.

There is illustrated in FIGS. 13–16 another embodiment of elastohydrodynamic sliding bearing in accordance with the present invention. This assembly is generally designated by the numeral 150 and comprises inner and outer members, in the present instance inner and outer rings 152 and 154 having confronting bearing surfaces 155 and 156. In the embodiment illustrated, the outer ring has a spherical bearing surface 156 having a radius of curvature R6, the bearing surface being divided into a plurality of segments 157 by a plurality of circumferentially spaced grooves or channels 159 angularly disposed relative to the axis A'—A' of the ring. The center C of the radius of curvature R6 of the bearing surface 156 of the outer ring is displaced axially from the geometric center of the bearing and to one side of a plane L through the contact areas or zones 164 of the bearing surfaces. The inner bearing surface 155 is defined by a plurality of convex surfaces of revolution 170 separated by a plurality of angularly disposed grooves 172 which are also angularly disposed in an opposite direction relative to the grooves in the outer ring. In this assembly because of the angular relationship of the helical surfaces to the bearing axis preferably in the range of less than 45 degrees, whereby the crown lines 170c of the surfaces 170 and crown lines 157c of the surfaces 157 are angularly disposed, the entrainment velocity component is greater than the sliding velocity component so that there is comparatively small development of friction and high development of film thickness so that similar to the previously described embodiments, there is comparatively small development of friction and high development of film thickness.

There is illustrated in FIGS. 17–19 inclusive another embodiment of elastohydrodynamic sliding bearing in accordance with the present invention. This assembly is generally designated by the numeral 200 and comprises inner and outer members, in the present instance inner and outer rings 202 and 204 having confronting bearing surfaces 205 and 206. In the embodiment illustrated, the bearing surface 206 of the outer ring is frusto-conical and is divided into a plurality of segments 207 by a plurality of circumferentially spaced grooves or channels 209 angularly disposed relative to the axis A"—A" of the ring. The inner bearing surface 205 is divided into a plurality of surfaces 211 by a plurality of angularly disposed grooves 212 which are also angularly disposed in an opposite direction relative to the grooves 209 in the outer ring and to the axis A"—A" of the bearing assembly.

In the present instance, each of the bearing surfaces 211 of the inner ring is of convex helical form, having a radius of curvature R9 smaller than the radius of curvature of R10 of the helical surfaces 206. By this arrangement the direction of the helical surfaces 211 and 206 are opposed so that in the assembled relation the crown lines 211C of the inner ring bearing surfaces are angularly disposed relative to the crown lines 207C of the bearing surfaces of the outer ring. Thus, on relative rotation of the rings, the contact zone between the ring moves along the crown lines and axially relative to the rings. By this arrangement the same effect in operation is achieved as in connection with the principal embodiment of the invention. For example, the angular relationship of the helical surfaces to the bearing axis is preferably small, that is, less than 45° whereby the entrainment velocity component is greater than the sliding velocity component so that there is comparatively small development of friction and high development of film thickness.

There is illustrated in FIGS. 20–22 another embodiment of elastohydrodynamic sliding bearing in accordance with the present invention. This bearing assembly is generally designated by the numeral 300 and comprises a pair of annular members, for example, rings 302 and 304 having circumferentially extending confronting bearing surfaces 303 and 305 in engagement with one another upon relative rotation of the rings.

In the present instance the bearing surface 303 is annular in form and is divided into a plurality of segments 307 by a plurality of circumferentially spaced non-radial grooves 309 which in the present instance extend tangentially relative to the inner edge of the opening in the center of the ring. Thus, the bearing segments 307 are generally pie-shaped and have a convex face defining an angularly disposed crown line 307A. The other ring 304 is of similar configuration, the bearing surface being annular in form and comprising a plurality of pie-shaped bearing segments 311 separated by a plurality of grooves 313 tangential to the circular edge of the opening at the center of the ring and disposed in an opposite direction relative to the grooves 309 in the opposite ring. By this arrangement the crown lines 307A and 311A are in engagement and during rotation of the rings relative to one another the contact zone moves along the crown line radially relative to the rings. In this way the entrainment velocity component is greater than the sliding velocity component so that there is comparatively small development of friction and high development of film thickness.

We claim:

1. A bearing comprising relatively movable members having confronting bearing surfaces, the bearing surface of one of the members being defined by a plurality of arcuate helical surfaces separated by a plurality of angularly directed grooves, the bearing surface of the other member being defined by a plurality of arcuate helical surfaces separated by circumferentially spaced angularly directed grooves, the helical surfaces of the members engaging at contact zones and being opposed so that the crown lines of the helical surfaces of one member are angularly disposed to the crown lines of the helical surfaces of the other member, a lubricant between the bearing surfaces, said lubricant forming a load-carrying uninterrupted elastohydrodynamic lubricant film between the bearing members at the contact zones at a predetermined range of rate of relative sliding movement of the members and at a predetermined range of loads thereby providing a fluid film-supported sliding bearing.

2. A bearing as claimed in claim 1 wherein said elastohydrodynamic film is formed when the range of certain variables is approximately in accordance with the following formulas:

$$\frac{G^{1.6}V^{0.7}}{L^{0.13}} \geq 1.5 \frac{\sigma}{R_0}$$

$$\frac{V}{L^2G^{1.7}} \leq 10^7$$

where G=the material parameter, V= dimensionless entrainment velocity of the relatively moving bearing surfaces, L=dimensionless load, σ=composite surface roughness of the bearing surfaces, $R_c$=the equivalent radii of the contacting bearing surfaces.

3. A bearing comprising inner and outer relatively rotatable members having confronting circumferentially extending bearing surfaces, the bearing surface of the inner member being defined by a first surface of revolution having a plurality of convex helical surfaces which extend angularly relative to a plane transverse to the central axis of the member and which are separated by a plurality of circumferentially spaced angularly directed grooves, the bearing surface of the outer member being defined by a second surface of revolution having a plurality of convex helical surfaces separated by circumferentially spaced angularly directed grooves, the helical surfaces of the outer member being disposed at an angle to a plane transverse to the central axis of the member and extending in a direction opposed to the helical surfaces of the inner member, said helical surfaces of the members engaging at contact zones, a lubricant between the bearing surfaces, said lubricant forming a load-carrying uninterrupted elastohydrodynamic lubricant film between the bearing members at the contact zones at a predetermined range of rate of relative sliding movement of the members and at a predetermined range of loads thereby providing a fluid film-supported sliding bearing.

4. A bearing as claimed in claim 1 wherein the first surface of revolution defines a cylinder and wherein the helical surfaces of the inner member are more convex that the cylinder on which they are inscribed and wherein the second surface of revolution defines a cylinder.

5. A bearing as claimed in claim 1 wherein the surface of revolution of said members is conical.

6. A bearing as claimed in claim 1 wherein the surface of revolution of said members is spherical.

7. A bearing as claimed in claim 1 wherein the helical surfaces of the members are opposed so that the crown lines of the helical surfaces of one member are angularly disposed to the crown lines of the helical surfaces of the other member, the angular relationship of the helical surfaces being less than 45° whereby the entrainment velocity component is greater than the sliding velocity component so that there is comparatively small development of friction and high development of film thickness.

8. A bearing comprising first and second relatively movable members having intercontacting bearing surfaces, one of said bearing surfaces being formed with a plurality of circumferentially spaced, spherical segments defining contact zones separated by a plurality of circumferentially spaced angularly directed grooves, the other bearing surface being spherical and divided into a plurality of segments by circumferentially spaced channels angularly disposed relative to said grooves, the radius of curvature of the segments being smaller than the radius of curvature of the other spherical bearing surface, a lubricant between the bearing surfaces, said lubricant forming a load-carrying uninterrupted elastohydrodynamic lubricant film between the bearing members at the contact zones at a predetermined range of rate of relative sliding movement of said members and at a predetermined range of loads thereby providing a fluid film-supported sliding bearing.

9. A bearing comprising first and second relatively movable members having intercontacting bearing surfaces, one of said bearing surfaces having a plurality of arcuate projections defining contact zones separated by a plurality of circumferentially spaced angularly directed grooves, each projection being defined by a convex surface of revolution, the other bearing surface being spherical having a radius of curvature with its center displaced axially from the geometrical center of the bearing and to one side of a plane through the contact zones and divided into a plurality of segments by circumferentially spaced channels angularly disposed relative to said grooves, the principal radii of each convex surface of revolution being smaller than the radius of curvature of said other spherical bearing surface, a lubricant between said bearing surfaces, said lubricant forming a load-carrying uninterrupted elastohydrodynamic lubricant film between the bearing members at the contact zones at a predetermined range of rate of relative sliding movement of said members and at a predetermined range of loads thereby providing a fluid film-supported sliding bearing.

10. A bearing as claimed in claim 1 wherein the relatively movable members comprise bearing rings having confronting bearing surfaces and wherein the surface of the outer ring is frusto-conical.

11. A bearing as claimed in claim 1 wherein the relatively movable members consist of a pair of annular members wherein the bearing surface of each member is divided into a plurality of segments by circumferentially spaced non-radial grooves extending tangentially relative to the inner edge of the opening in the center of each ring thereby defining pie-shaped segments having a convex face.

References Cited

FOREIGN PATENTS 475,732 11/1937 Great Britain.
702,033 1/1954 Great Britain.

MARTIN P. SCHWADRON, Primary Examiner

F. SUSKO, Assistant Examiner